(12) United States Patent
Mustazza et al.

(10) Patent No.: US 11,729,161 B1
(45) Date of Patent: Aug. 15, 2023

(54) PRE-BUILT, PRE-TESTED, AND STANDARDIZED CONNECTORS FOR END-TO-END CONNECTION

(71) Applicant: CITIBANK, N.A., New York, NY (US)

(72) Inventors: Jenny Mustazza, Closter, NJ (US); Anita Parker, Highland Park, NJ (US)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/082,526

(22) Filed: Dec. 15, 2022

(51) Int. Cl.
*H04L 29/06* (2006.01)
*H04L 9/40* (2022.01)
*H04L 67/53* (2022.01)

(52) U.S. Cl.
CPC ........ *H04L 63/0823* (2013.01); *H04L 63/102* (2013.01); *H04L 63/105* (2013.01); *H04L 67/53* (2022.05)

(58) Field of Classification Search
CPC ... H04L 63/0823; H04L 67/53; H04L 63/102; H04L 63/105
See application file for complete search history.

(56) References Cited

U.S. PATENT DOCUMENTS

| | | | | |
|---|---|---|---|---|
| 10,237,294 | B1 * | 3/2019 | Zadeh | H04L 63/1425 |
| 2018/0004585 | A1 * | 1/2018 | Aguilar Mares | G06F 9/45558 |
| 2018/0191718 | A1 * | 7/2018 | Kuzkin | G06F 8/60 |
| 2019/0014469 | A1 * | 1/2019 | Dees | H04L 63/162 |
| 2020/0021620 | A1 * | 1/2020 | Puratheppparambil | H04L 63/102 |
| 2020/0084229 | A1 * | 3/2020 | Areno | G06F 21/71 |
| 2021/0216288 | A1 * | 7/2021 | Bahrami | G06F 11/3688 |

* cited by examiner

*Primary Examiner* — Tongoc Tran
(74) *Attorney, Agent, or Firm* — Johnson, Marcou, Isaacs & Nix, LLC; George Marcou; Scott A. Hendrix

(57) ABSTRACT

A network system to provide a centralized system to connect to third-party systems by using pre-built, secure, and pre-tested standardized connectors to data and services provided via APIs. A service provider pre-configures third-party systems connections to establish a type of certificate required, establish a security level required for each third-party system connection, pre-configure a software connection, and test the connection. The service provider presents a graphical user interface to a user of a client system with representations of each pre-configured third-party system connection. When a client selects a third-party system connection to connect with the client system data, the service provider generates a certificate signing request, communicates a private key to the client system, and communicates the client system data and the certificate signing request to a certificate authority system. Based on the obtained certificates, the service provider provides access to the required APIs via the pre-configured connection.

20 Claims, 7 Drawing Sheets

200

```
Method to provide end-to-end integration of API connectors
between clients and third-party service providers
```

210
Pre-configure third-party connections to allow integration to client data via APIs

220
Present an API integration portal on a graphical user interface to a client computing device, the presentation including one or more third-party systems

230
Receive a selection, from a client, of a third-party system with which to connect and a data set to communicate

240
Create a statement of work to communicate to the client

250
Receive organization and contact data from client and a request to pursue a certificate

260
Generate a certificate signing request and present the client with a private key

270
Communicate the client data and a certificate signing request to certificate authority system

280
Provide access to data and services associated with client to third-party system upon request based on the certificate authority

Fig. 2

PRE-BUILT, PRE-TESTED, AND STANDARDIZED CONNECTORS FOR END-TO-END CONNECTION

FIELD OF THE INVENTION

The technology relates generally to the field of connection of third-party service applications, and more particularly to providing a centralized system to improve the technology of connecting to third-party systems by using pre-built, secure, and pre-tested standardized connectors to data and services provided via APIs.

BACKGROUND OF THE INVENTION

Institutions, software companies, and other systems acting as a service provider conventionally provide data access to third-party systems. This data, may be associated with, or on behalf of, a client of the service provider system. For example, a client system may use a third-party software system that performs data consolidation services. The third-party system requires data associated with the client from the service provider system to perform the services. In certain examples, client systems access data from the service provider system via an Application Programming Interface ("API"). In other examples, the client system utilizes the third-party system to access the data via the API. The data may be used by the third-party system, processed, analyzed, or simply forwarded to the client system. Communication of the data from the service provider system into the third-party system using a digital certificate security program currently requires an extensive process.

An API is a software intermediary that allows two or more applications to communicate. The application using an API may refer to any software or hardware that performs a function for a computing device that needs to communicate with a second application to obtain data or services to perform the function. In an example, an application on a user computing device may be requested to display current, timely data such as sports scores. The application may request updated scores from a server. The application must request the data using an API on the server to ensure that the communications are in an appropriate format and routed to an appropriate service. The API serves as an agreement on how requests and responses are to be configured and structured by developers for communication between the devices.

To connect two computing systems for communications a connection must be built and coded to allow the API to be downloaded and used. A service provider server must ensure that the computing device requesting to access the API is not fraudulent or misrepresenting the identity of the requester.

The conventional process to build a connection must be configured and coded at the time of connection. In conventional systems, a client must manually inform a service provider system that the client would like to connect with an external computer system associated with the client. The process begins with the client contacting a client representative from the service provider system to let the representative know that the client is requesting a connection. The representative sets up a kickoff meeting to discuss the connection scope such as the third-party solution the client wants to use, API's that may be required, and the scope of the data involved in the connection. The client is requested to obtain certificates to secure the connection to the third party.

Traditionally, the obtaining of the correct certificates is cumbersome and error-prone causing delays to the project as the client seldom has convenient and consistent method to obtain the correct certificates. One reason for the difficulty is because the necessary information is held by multiple, disparate parties such as the service provider, the client, and the client's third-party supplier. Another difficulty is that different institutions require different types of certificates. Predicting the type of certificate that will be required requires a deep knowledge of the system and its requirements. Further, the client needs to know what certificate authorities the service provider system accepts and the security level of the certificate and the maximum expiration period. Clients often make errors in providing data such as the maximum expiration period. Additionally, the client must request the certificate through their own procurement department. Involving other departments creates bottlenecks and adds to the burden. Often, once the certificate is received, one of the service provider system requirements (such as certificate level, certificate authority, or expiration date) is incorrect or incompatible, requiring the client to restart the process. With the bottlenecks, delays, and errors, the certificate process typically requires between 20 and 45 days to complete.

After the certificates are obtained, the connection between the two devices must be built. Different APIs have different security protocols, connection parameters, coding requirements, and other connection characteristics that must be built, modified, or created to allow the connection. The owner of the API typically does not have in advance information about the connecting computer device or system. The information to build the connection is located among multiple participants, such as the connecting computing device, the server providing the API, and the certificate authority. Further, each of these groups may need to access information from their own software suppliers.

After the connection is configured and built, the connection of the APIs must be tested because each connection is built per order at the time of the request. The connection must be tested over a wide variety of parameters, such as for coding errors, bandwidth, resilience, incompatible certificates, and other error pathways. Errors are often discovered after the connection has been coded and configured, which causes additional time delays.

Typically, obtaining the certificates and building the connection require over 100 days to complete. Conventional systems are unable to provide a centralized system to connect systems to third-party systems by using pre-built, pre-tested, and secure, and tested standardized connectors to data and services provided via APIs.

BRIEF DESCRIPTION OF THE DRAWINGS

FIG. 2 is a block flow diagram depicting a method to connect to third-party systems by using pre-built, secure, and pre-tested standardized connectors to data and services provided via APIs.

DETAILED DESCRIPTION

Example System Architecture

Figure 1:
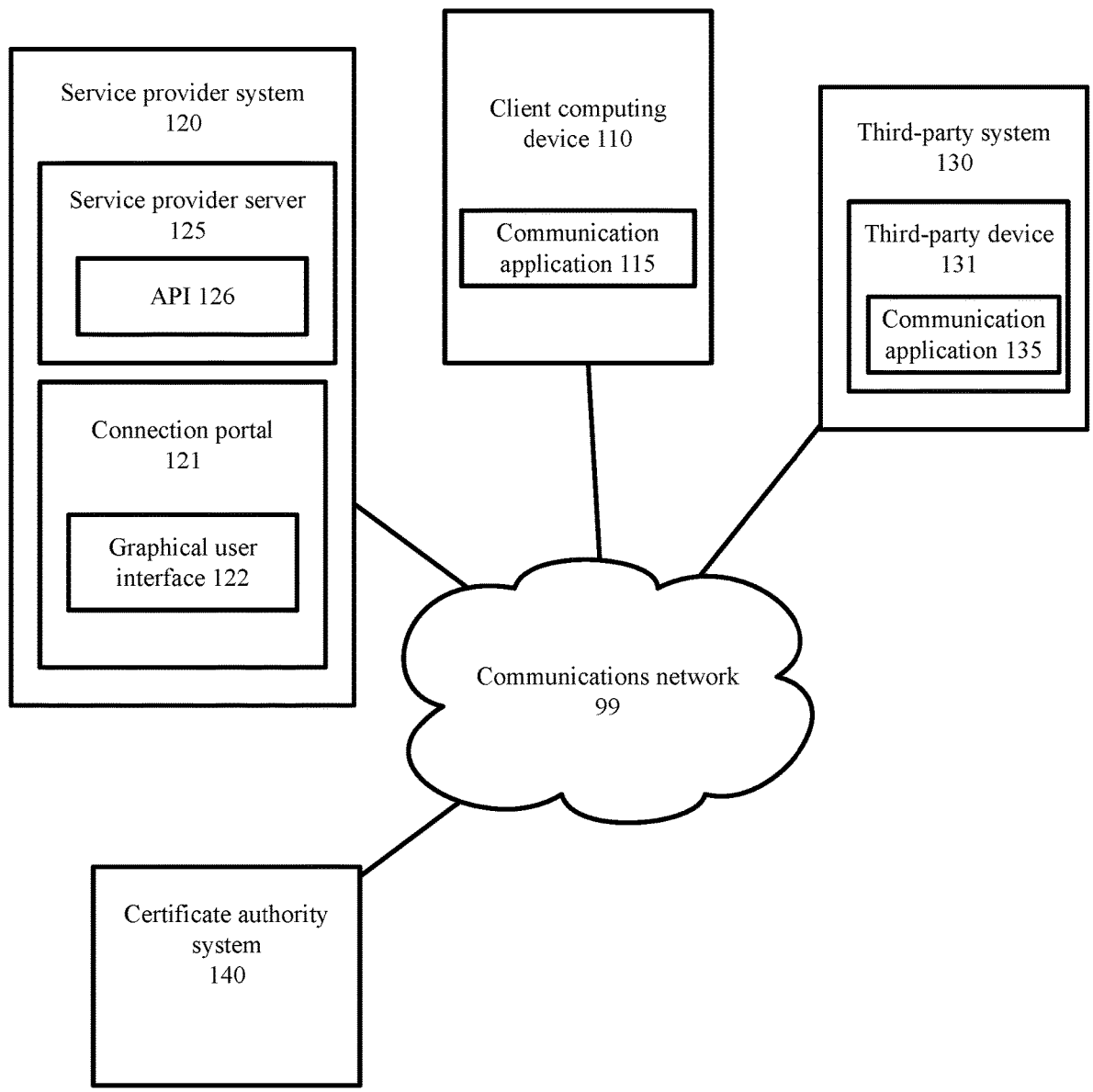
FIG. 1 is a block diagram depicting a system to connect to third-party systems by using pre-built, secure, and pre-tested standardized connectors to data and services provided via APIs.

FIG. 1 is a block diagram depicting a system to connect to third-party systems by using pre-built, secure, and pre-tested standardized connectors to data and services provided via APIs. As depicted in FIG. 1, the architecture 100 includes a client computing device 110, service provider system 120, a third-party system 130, and a certificate authority system 140 that are connected by communications network 99.

Each network, such as communication network 99, includes a wired or wireless telecommunication mechanism and/or protocol by which the components depicted in FIG. 1 can exchange data. For example, each network 99 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, the terms "data" and "information" are used interchangeably herein to refer to text, images, audio, video, or any other form of information that can exist in a computer-based environment. The communication technology utilized by the components depicted in FIG. 1 may be similar to network technology used by network 99 or an alternative communication technology.

Each component depicted in FIG. 1 includes a computing device having a communication application capable of transmitting and receiving data over the network 99 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the client computing device 110 is operated by an end-user, client, client operator, or other user that may user the client computing device 110 to communicate with a service provider system 120, third-party device 131, the certificate authority system 140, or other device to access services or data. While each server, system, and device shown in the architecture is represented by one instance of the server, system, or device, multiple instances of each can be used.

The service provider server 125 may host the API 126 and any other suitable tools, functions, processes, or modules for allowing the client computing device 110 or the third-party system 130 to access any data or services from the service provider system 120. The functions of the API 126 are described herein. When the processes described herein are practiced, the third-party device 131 or the client computing device 110 may download or otherwise access the API 126 to provide a gateway to access data from the service provider server 125.

As shown in FIG. 1, the client computing device 110 includes a data storage unit (not shown) accessible by a communication application 115. The communication application 115 on the client computing device 110 may be, for example, a web browser application or a stand-alone application, to view, download, upload, or otherwise access documents, user interfaces, or web pages via the networks 99. The communication application 115 can interact with web servers or other computing devices connected to the network 99, such as by conducting and authorizing an interaction with the service provider system 120, third-party system 130, the certificate authority system 140, or other device to access services. The user may use the client computing device 110 to access an account, select a third-party system 130, obtain a certificate, or perform any other actions in association with the service provider system 120, third-party system 130, the certificate authority system 140, or other device to access services.

As shown in FIG. 1, the service provider system 120 includes a data storage unit (not shown) accessible by the service provider server 125. The service provider system 120 represents any device, computing system, organization, cloud computing system, or other device or system that is suitable to manage a user account and provide services to a client including services to generate API connections by using pre-built, secure, and pre-tested standardized connectors. The service provider server 125 operating on the service provider system 120 hosts the connection portal 121 and performs any other suitable computing or communication functions. The connection portal 121 allows users to perform certain ones of the functions described herein by providing a graphical user interface 122 to the user. The graphical user interface 122 may be displayed on a client computing device 110 when the service provider system 120 is accessed, such as by a webpage or an application.

As shown in FIG. 1, the third-party system 130 includes third-party device 131 and a data storage unit (not shown) accessible by a communication application 135. The third-party system 130 and the third-party device 131 may represent a device, a server, a network, or any other device or system that manages the third-party services that are provided to the client computing device 110. The communication application 135 on the third-party device 131 may be, for example, a web browser application or a stand-alone application, to view, download, upload, or otherwise access documents, user interfaces, or web pages via the networks 99. The communication application 135 can interact with web servers or other computing devices connected to the network 99, such as by conducting and authorizing an interaction with the client computing device 110, the service provider system 120, the certificate authority system 140, or other device to access services. An operator of the third-party system 130 may use the third-party device 131 to access data on a user account on the service provider system 120 or perform any other actions in association with the service provider system 120, the certificate authority system 140, or other device to access services.

The certificate authority system 140 represents any device, server, or system that provides digital certificates to the client computing devices 110 or the service provider system 120 to allow third-party systems 130 to be connected with data or services from the service provider system 120, as described herein. A certificate certifies the ownership of a public key by the named subject of the certificate. The service provider system 120, third-party system 130, and others may rely upon signatures or on assertions made about a private key that corresponds to the certified public key. By receiving the certificates and verifying identities, the service provider system 120 allows third-party systems 130 to receive direct access to data via an API 126.

Figure 7:
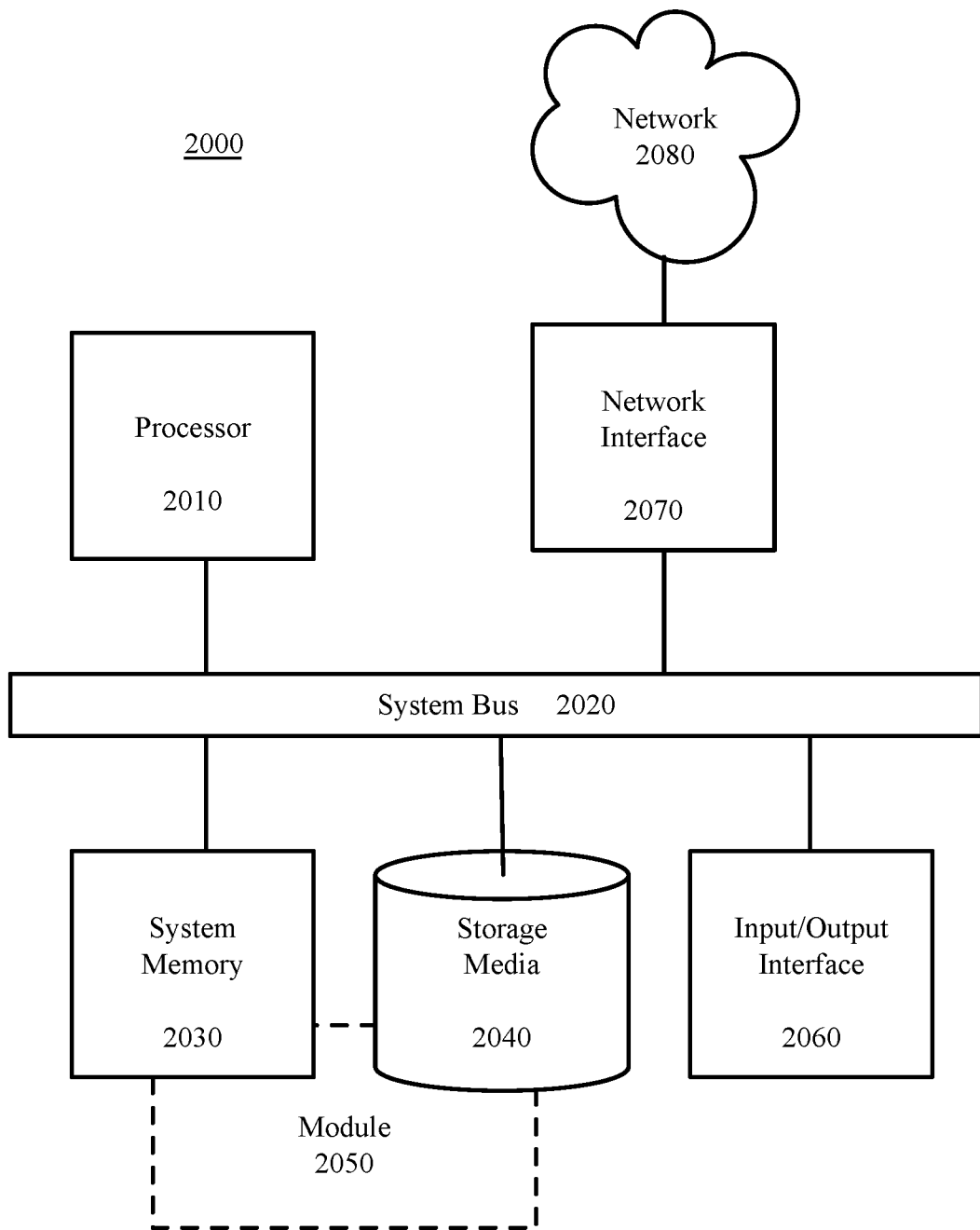
FIG. 7 depicts a computing machine and a module.

In example embodiments, the network computing devices and any other computing machines associated with the technology presented herein may be any type of computing machine such as, but not limited to, those discussed in more detail with respect to FIG. 7. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 7. The computing machines discussed herein may communicate with one another, as well as with other computing machines or communication systems over one or more networks, such as network 99. The network 99 may include any type of data or communications network, including any of the network technology discussed with respect to FIG. 7.

Example Embodiments

Reference will now be made in detail to embodiments of the invention, one or more examples of which are illustrated in the accompanying drawings. Each example is provided by way of explanation of the invention, not as a limitation of the invention. Those skilled in the art will recognize that various modifications and variations can be made in the present invention without departing from the scope or spirit of the invention. For example, features illustrated or described as part of one embodiment can be used in another embodiment to yield a still further embodiment. Thus, the technology covers such modifications and variations that come within the scope of the invention.

The technology for embodiments of the invention may employ methods and systems to improve the technology of generating and building API connections by using pre-built, secure, and pre-tested standardized connectors. The system provides a centralized system to build a connection to allow system data and services to be accessed by a third-party system. Instead of building continuously new connections that allow access to APIs and having clients perform the tasks of identifying and obtaining new certificates for each connection, the system provides a pre-configured connection. The system provides the standardized connections by pre-building and pre-testing the connections by collecting the diverse information required for each digital certificate and third-party system and requesting and generating digital certificates based on the collected information through a third-party certificate authority. Further, each standardized connection is tested and validated before being used by a client. Each standardized connection is tested and validated with different characteristics based on the different client systems, different connection types, different third-party systems, different devices, different certificate authorities, and other different characteristics. The pre-validation allows the system to be utilized immediately without the need for exhaustive testing before deployment to identify errors in bandwidth, resilience, incompatible certificates, and other error pathways.

The examples for embodiments of the invention may employ computer hardware and software, including, without limitation, one or more processors coupled to memory and non-transitory computer-readable storage media with one or more executable computer application programs stored thereon, which instruct the processors to perform such methods.

Figure 3:
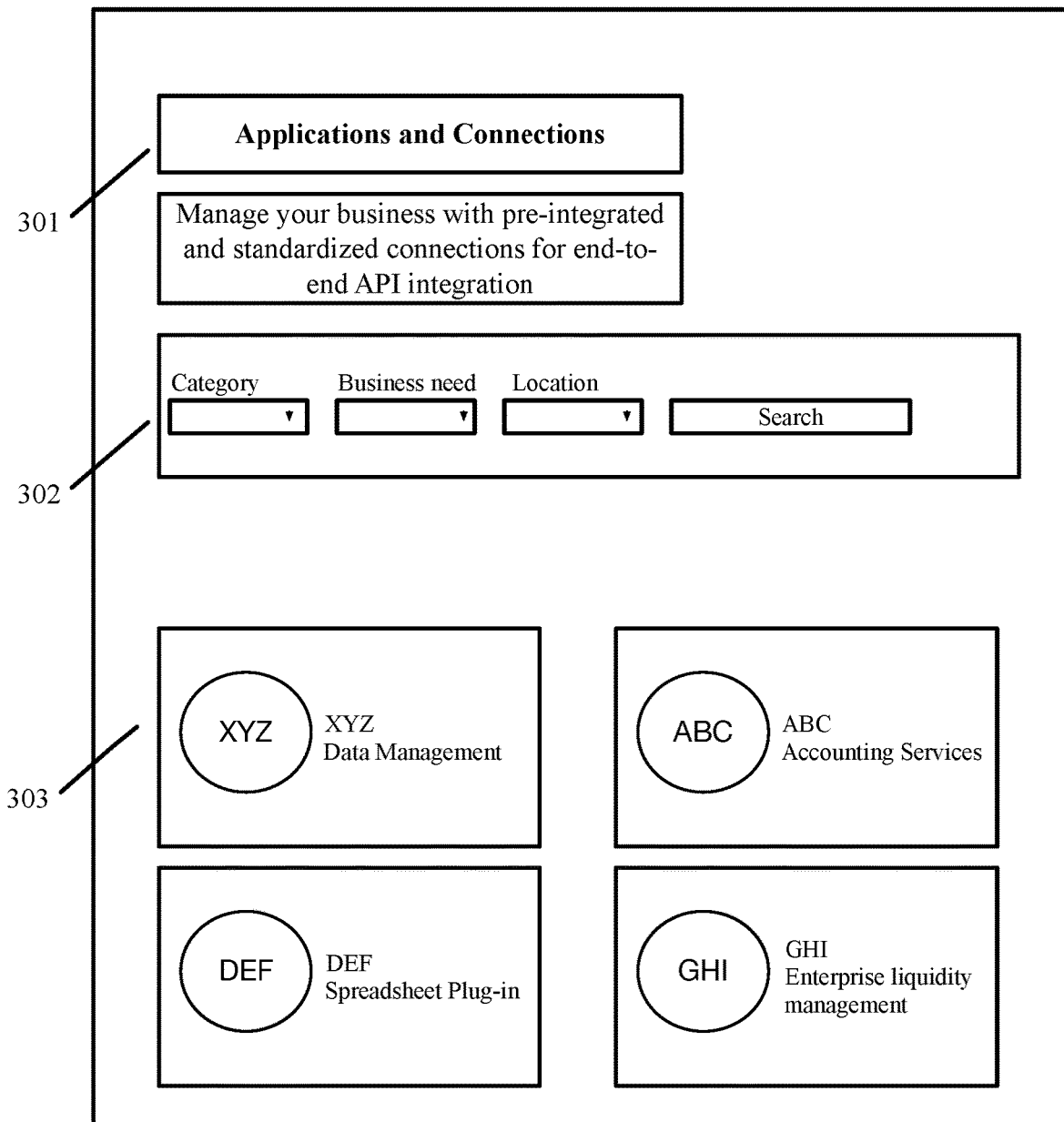
FIG. 3 is an illustration of an example graphical user interface to select a third-party system to be connected.

The example methods illustrated in FIGS. 2-3 are described hereinafter with respect to the components of the example communications and processing architecture 100.

FIG. 2 is a block flow diagram depicting a method 200 to connect to third-party systems 130 by using pre-built, secure, and pre-tested standardized connectors to data and services provided via APIs 126.

In block 210, the service provider system 120 pre-configures third-party connections to allow connection to client data via APIs 126. The service provider system 120 identifies third-party devices 110 associated with third-party systems that would be likely to require access to data of a client account. The third-party devices 110 may be associated with systems that would use client data on the service provider system 120 to perform third-party services such as data management services, accounting services, spreadsheet services, payroll services, interaction services, or other types of third-party services.

In the examples, each of the third-party devices 131 would require access to data of the client that is managed or held by the service provider system 120 to perform specific tasks for the client. For example, a third-party device 131 of a data management system may utilize client account data from the service provider system 120 as an input into an data management package. The third-party devices 131 may desire access to data such as inputs and outputs of account data of the client, account values of the client accounts, types of data entered, interaction counterparties, types of interactions, and any other suitable accounting data. For example, the data management system may perform services on collected data such as collecting, processing, governing, sharing, and analyzing the data.

In another example, a third-party device 131 of an accounting service may utilize client account data from the service provider system 120 as an input into an accounting software package. The third-party devices 131 may desire access to data such as inputs and outputs of transaction data of the client, account values of the client accounts, taxes and service fees paid by the client account, and any other suitable accounting data. In another example, a third-party device 131 of an enterprise liquidity management service may utilize client account data from the service provider system 120 as an input. The third-party devices 131 may desire access to data such as data for bank reporting, reconciliation of accounts, payment integration, and other data related to enterprise liquidity.

In an example, a third-party device 131 of a spreadsheet plug-in application may utilize client account data from the service provider system 120 as an input. The third-party devices 131 may desire access to real-time data in the account to use as inputs to a spreadsheet as desired by the client or any other suitable user. For example, if the third-party device 131 is accessing real-time data to plug into a spreadsheet that monitors a specific account activity, then the connection would allow that data to be continuously or periodically communicated to the third-party device 131 as the data is updated. In an example, a third-party device 131 of a cash forecasting application may utilize client account data from the service provider system 120 as an input to allow the third-party device 131 to provide automated cash forecasting using working capital insights from the client account. Any other suitable third-party device 131 from any suitable third-party system 130 may desire to have a connection allowing access to client data.

To allow the data management system of the example, or any other third-party system, to access the data securely, the service provider system 120 must provide a connection to the third-party device 130 via an API 126. The service provider system 120 requires digital certificates be acquired by the client computing device 110 to secure the connection of the third-party system 130 to the data in the client account. With the secure, tested connection, and the required certificates, the service provider system 120 may securely provide access to the data via an API 126.

The service provider system 120 identifies the certificate requirements to provide access to the third-party system 130. For example, certain third-party systems 130 may require different certificates or even different certificate authority systems 140. By identifying the types of certificates required at this stage, the service provider system 120 doesn't have to investigate the certificate requirements of a third-party system 130 at the time of connection with the client computing device 110. The service provider system 120 identifies the data that will be required to submit the certificate signing request when needed.

The service provider system 120 prepares the data for the certificate signing request to prepare for future selections of each third-party system 130. In an example, a section of code may be created for the request that includes data associated with the third-party system 130 or the client, such as a common name for the third-party system 130 (such as a domain name), an organization legal name, an organization unit, a public key, a phone number, a city, state, and country in which the organization is located, or any other suitable data. The data may additionally include data related to a technical contact of the third-party system 130 or the client, such as a first and last name, an email address, a job title, a phone number, or any other suitable data. Different certificate authority systems 140 require different data on a certificate signing request. The service provider system 120 gathers all of the requirements of each certificate authority system 140 to create the code for future certificate signing requests.

The service provider system 120 generates any required coding or programming required to construct a connection to provide access to the third-party system 130. The connection allows the third-party device 131 to access data in the customer account or other suitable data. The connection allows the third-party device 131 to access the data via an API 126. The service provider system 120 identifies the rules of the API that the third-party device 131 would follow to access the data. The rules would dictate the formats of queries or requests to which the API 126 respond. The rules dictate the types of data that are available for each third-party device 131 and for each client. For example, for a third-party device 131 associated with a data management system, data associated with a client personnel file may be restricted from access because personnel data is not part of the set of data that the data management system is permitted to analyze.

For example, the service provider system 120 determines the types of data requests and the configuration of the data requests from the third-party system 130. Certain data is required to be provided to establish a connection with different APIs. Certain APIs have different security standards that require different data for a connection. For example, certain APIs only require a password or sign-in to be established for a connection, while other APIs require greater levels of verification, such as a digital certificate, as described herein.

In certain API connections, a gateway for secure access to the devices of the service provider system 120 must be established. The service provider system 120 establishes the endpoint URL of the API 126 to which the third-party device 131 will connect. The process that the third-party device 131 will be required to follow to provide the signed certificates is configured in the code. The service provider system 120 identifies any other suitable API characteristics that would be required to communicate and share data or services with the third-party system 130.

An operator or other designer of the service provider system 120 prepares the connection by programming the code for the connection for each particular third-party device 131. The code is prepared for use by the service provider system 120 when a new connection is requested by a client. The code is prepared for use by the third-party device 131 to allow the third-party device 131 to access the API 126 and any requested data in the proper format via the API 126.

For example, the service provider system 120 provides code to the third-party system 130 that identifies the commands required to access the system, access the API 126, make requests via the API 126, receive data from the service provider system 120, and any other requirements. In the example, the service provider system 120 receives data from the third-party system 130 relating to the type of requests that will be made, the format and configuration of requests, the format and configuration of data that can be received by the third-party system 130, and any other suitable requirements or concerns. When the formats or configurations do not match, the service provider system 120 and/or the third-party system 130 revise the code or software to ensure that the system codes are aligned. For example, if the third-party system 130 receives data in a format that is different than the format in which the service provider system 120 provides data, then either the service provider system 120 or the third-party system 130 revises the format to make the formats match.

The service provider system 120 and the third-party system 130 prepare software and configurations for the connection such that when the connection is desired, the connection is pre-built and pre-configured. The connection is configured such that after the client obtains the certificates (as described herein), those certificates may be uploaded and configured in both the third-party system 130 (such as via Software as a Service or on a computing device of the third-party system 130) and in the service provider system 120. The connection with the service provider system 120 is configured to allow a client to retrieve requested data through the third-party connection with the service provider system 120 through a secure, authenticated method.

Upon connection, the service provider system 120 and the third-party system 130 have all coding and configuration complete and the service provider system 120 and the third-party system 130 are able to communicate via the API 126 immediately without further coding or configuration.

The service provider system 120 performs testing and validation to ensure that a connection with the third-party system 130 is secure. By performing the testing and validation before an attempted connection, the client saves testing time after connection and is further assured that the connection is secure. The service provider system 120 may test and validate a connection by performing trial connections with trial customers to determine that when different types of client computing devices 110 are connected with the third-party system 130, the connections remain secure from outside interference or security lapses.

In an example, the service provider system 120 selects a test client that may be real or simulated for the testing process. The test client may perform a real or simulated selection of a third-party system 130 with which to connect. The service provider system 120 performs any or all of the steps of connecting the test client to the selected third-party system 130, such as obtaining a certificate, communicating the required coding for the third-party device 131 to connect to the service provider system 120 via an API 126, and actually providing data to the third-party device 131. When the testing or simulation is performed, the service provider system 120 is able to detect bugs in the coding or the system, errors in the certificate request, inaccurate formatting in the API calls, or any other suitable errors, bugs, or conflicts in the connection. Other test clients may be used to test a variety of different client types using a variety of different client computing devices. After a suitable number of tests or simulations, the likelihood that a subsequent connection for an actual client request will be error-free is increased.

When one or more of the third-party devices 110 are selected, pre-tested, and validated, the one or more of the third-party devices 110 are identified as ready for connection with a client computing device 110.

In block 220, the service provider system 120 presents an API connection portal 121 on a graphical user interface 122 to a client computing device 110, the presentation including one or more third-party systems. The user computing device 110 may view the application via the communication application 115 on a webpage of the service provider system 120 or an application associated with the service provider system 120.

The service provider system 120 determines a set of one or more third-party systems 130 that have been pre-built and are recommended for the client computing device 110. The set may be all pre-built third-party systems 130, or the set may be based on the type of organization or person that is operating the client computing device 110. The service provider system 120 displays the set of third-party systems 130 on the graphical user interface 122 to allow a user to select a third-party system 130 with which to connect.

An illustration of the display is provided with more details in FIG. 3.

FIG. 3 is an illustration of a screen 300 of an example graphical user interface 122 on the connection portal 121 to select a third-party system to be connected.

The screen 300 includes a title block 301 to identify the page of the graphical user interface 122. The example illustrates the title block 301 as "Applications and Connections."

The screen 300 includes a search block 302 to search for a particular third-party system 130. The example illustrates three search pull down menus—one each for selecting a type of "category," a type of "business need," and a "location." For example, a user may enter a category of "data management," a business need of "analytics," and a location of "Atlanta." The pulldown options may allow the service provider system 120 to select which third-party systems 130 to display. For example, a third-party device 130 dedicated to providing a service of Sales Consulting might be removed from the list while a third-party system 130 located in Atlanta and a third-party system 130 performing data management services may be included in the list.

The search block 301 may further include a search bar that allows a user to enter one or more direct search terms. For example, a user may enter a search question or a series of keywords. The service provider system 120 may use the search entry to identify one or more third-party systems 130 to display based associations with the search terms.

The screen 300 includes a set of third-party systems 130 display. The example illustrates a display 303 of XYZ Data Management third-party. If XYZ was selected for display based on a search by the user or based on any other criteria for selecting the third-party systems 130 to display, then the user is presented with the interface object 303 for selection by the user. The user may click on the interface object 303 or otherwise select XYZ for connection. Any other number of suitable third-party systems 130 may be displayed on the graphical user interface 122.

Returning to FIG. 2, in block 230, the service provider system 120 receives a selection, from a client computing device 110, of a third-party system 130 with which to connect and a data set to communicate. The user may enter a selection by clicking on an interface object representing a particular third-party system 130. Any other selection technology may be used such as a verbal command, a text entry, or any other suitable technology. The client may enter a specific data set of the user account to share with the third-party system 130, such as by selecting from a menu of data or manually entering files or datasets to include in the connection. Different data sets may be made available to different types of third-party systems 130. For example, an accounting system third-party may have access to financial data that a spreadsheet third-party may be prevented from accessing. The details of block 230 are illustrated in the example of FIG. 4.

Figure 4:
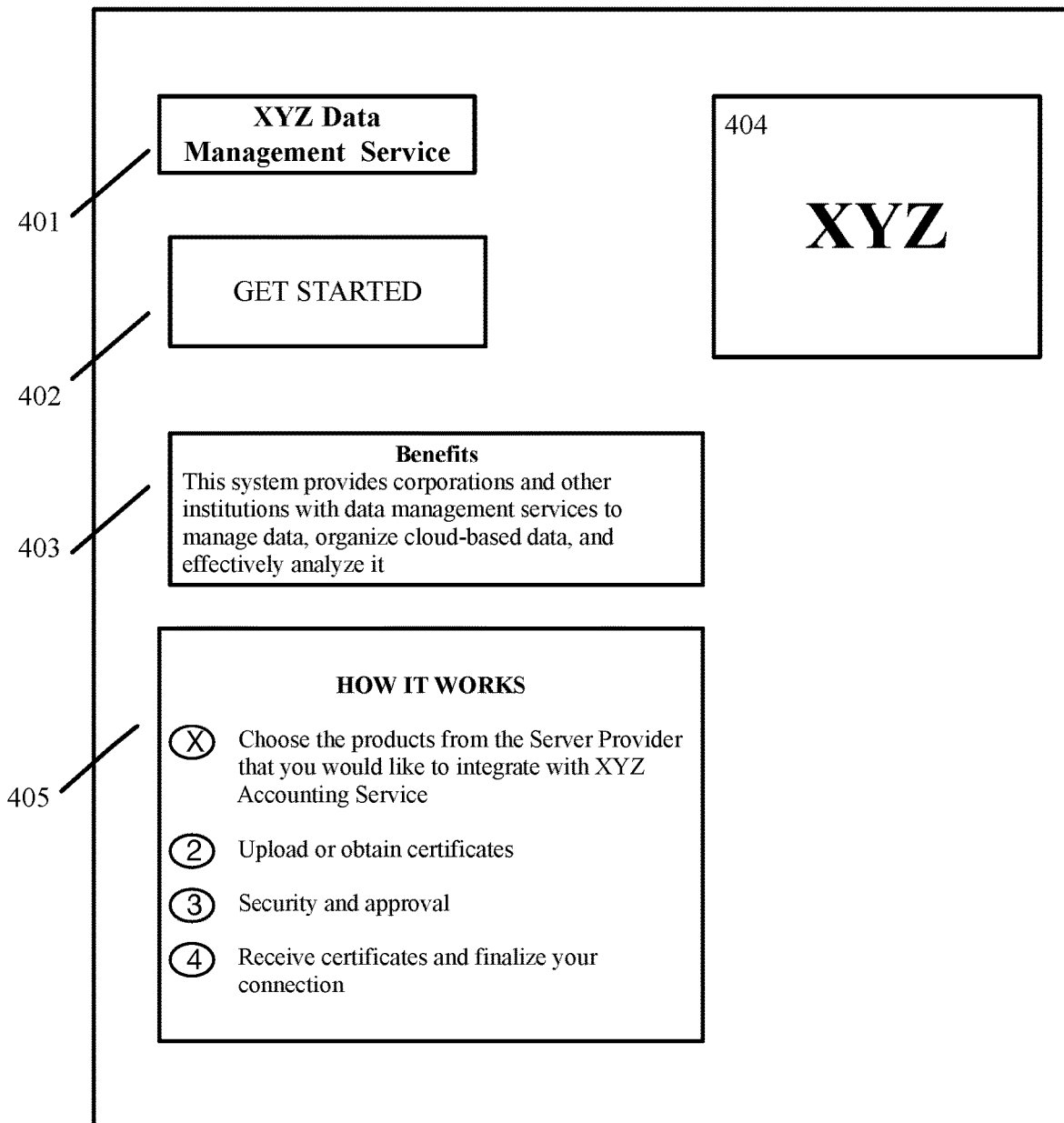
FIG. 4 is an illustration of an example graphical user interface to begin a connection of a selected third-party system.

FIG. 4 is an illustration of a screen 400 of an example graphical user interface 122 on a connection portal 121 to begin a connection of a selected third-party system. In the continuing example, a client has selected XYZ Data Management for connection. That is, the client has indicated that the client wants to connect a third-party system 130 with the user account of the client with the service provider system 120. The client wants the third-party system 130 to have access to a set of the user data so that the third-party system 130 can use the data to provide further services to the client. In this example, the client has indicated that XYZ should have access to the client data in the user account so that XYZ can perform data management tasks using that data.

In the graphical user interface 122, a title block 401 is illustrated. The title block 401 indicates the third-party system 130 that was selected for connection. An interface object 402 is illustrated with a display of the recommendation "Get Started." Selecting this interface object 402 will cause the service provider system 120 to proceed with the connection. Display 403 illustrates a description of the services that may be provided by XYZ. Display 404 illustrates a logo or other representation of XYZ.

Display 405 provides an illustration of a set of steps of the connection process. The display 405 provides to a client the four steps of the process. The step marked by the X illustrates the step in the process at which the client is located.

Returning to FIG. 2, in block 240, the service provider system 120 creates a statement of work to communicate to the client. The statement of work is communicated to the client computing system 110 for approval by the client. The statement of work may be a narrative description of a process to be undertaken to obtain certificates for an API 126 to allow access to the third-party system 130. The statement of work may define project-specific activities, deliverables, and timelines for the connection. The client may approve the statement by responding to the service provider system 120 with a communication, or by any other suitable method.

Upon receipt of the approval of the statement of work, the service provider system 120 communicates to the client computing device 110 a notification and a link, or other object or directions, to sign back into the connection portal 121 via the graphical user interface 122.

In block 250, the service provider system 120 receives organization and contact data from the client and a request to pursue a certificate. The client signs back into the connection portal 121 and provides the requested data and instructions. The details of block 250 are illustrated in the example of FIG. 5.

Figure 5:
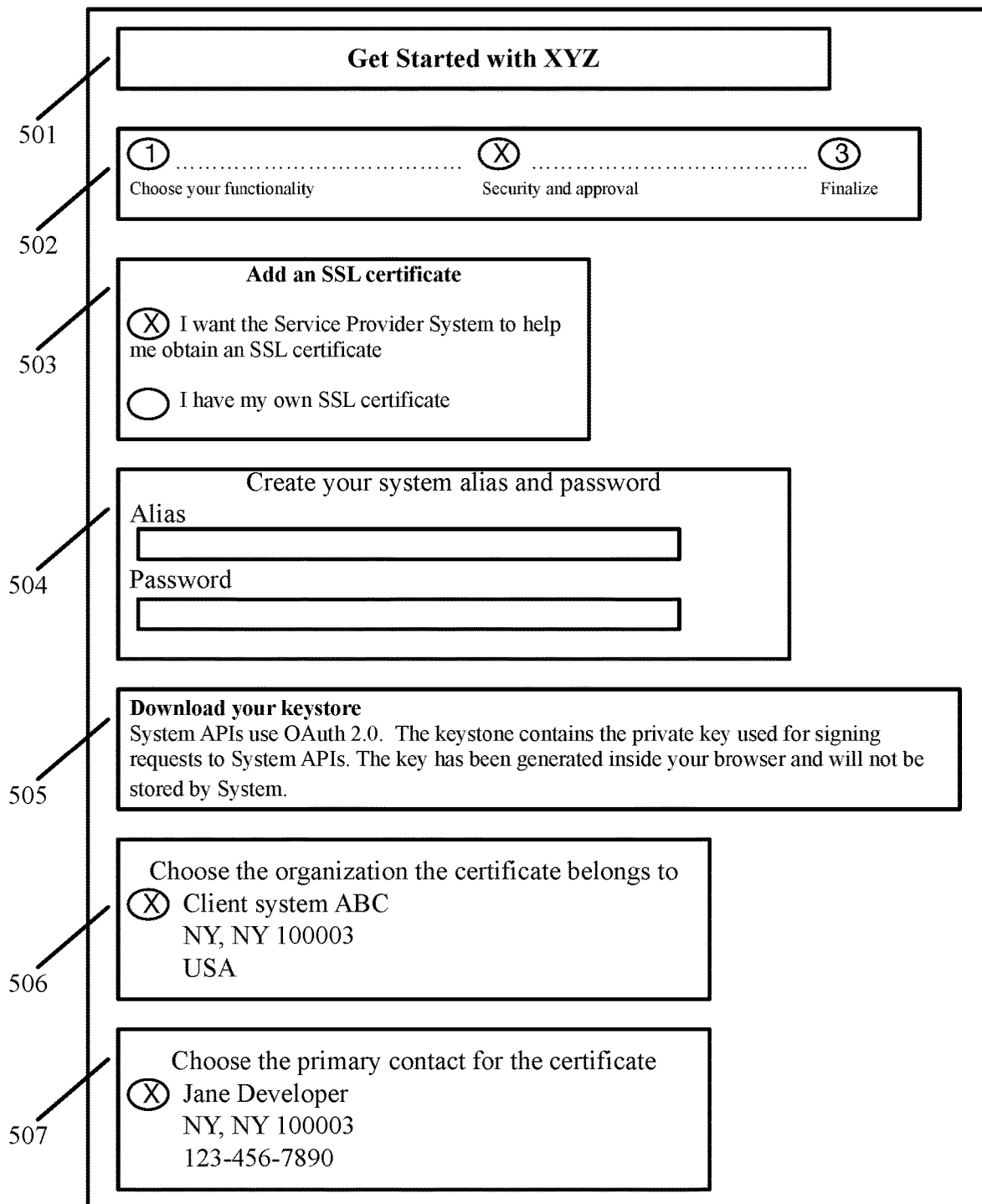
FIG. 5 is an illustration of an example graphical user interface to obtain a certificate for connection of a selected third-party system.

FIG. 5 is an illustration of a screen 500 of an example graphical user interface 122 to obtain a certificate for connection of a selected third-party system.

Upon signing back into the connection portal 121, a client is presented with a screen 500 of the graphical user interface 122. In this continuing example, the client has elected to proceed with the connection with the XYZ Data Management third-party. The screen 500 is illustrated with a title block 501 that indicates the type of screen 500 being presented. Status block 502 illustrates the stage of the connection journey being presented. In the example, the client is at the second stage, which is the security and approval stage.

The screen 500 is illustrated with a certificate request block 503. The client is provided with an option to request that the service provider system 120 obtain the certificate to allow the third-party with access to the client account or to decline the option. As illustrated, the client has selected the option to request the service.

The screen 500 is illustrated with a sign-in block 504. The block 504 allows the client to create a username or alias and choose a password. The screen 500 is illustrated with a description block 505 that describes the type of certificate system utilized by the service provider system 120 and the third-party system 130. The screen 500 is illustrated with a block 506 to enter the client organization. For example, the client can select from a list of previously obtained client organization information or enter new organization information. The screen 500 is illustrated with a block 507 to enter the client contact. For example, the client can select from a list of previously obtained client contact information or enter new organization contact information.

Returning to FIG. 2, in block 260, the service provider system 120 generates a certificate signing request and presents the client with a private key.

The service provider system 120 assembles the client data to create a request for the digital certificate to allow access to client data in the user account on the service provider system 120. The service provider system 120 has identified the data that will be required because the service provider system 120 has established during the pre-configuration the requirements of the certificate authority system 140 and the third-party system, as described in block 210. The service provider system 120 will provide the necessary data, utilize the appropriate certificate authority system 140, and refrain from providing unnecessary data. In an example, a section of code is created for the request that includes data such as a common name for the third-party system 130 such as a domain name, an organization legal name, a city, state, and country in which the organization is located, an email address of a contact, a public key, or any other suitable data.

The service provider system 120 communicates a private key to the client computing device 110. The private key is a separate file that may be used in the encryption/decryption of data sent between the service provider system 120, the third-party device 131, and the client computing device 110. The private key is created by service provider system 120 for the client computing device 110 as the certificate owner. The private key is generated once the customer has submitted the information requested for the certificate procurement. Once the private key is downloaded, the client is able to submit the information in order to request the certificate.

In block 270, the service provider system 120 communicates the client information and a request to generate the certificate to the certificate authority system 140. The appropriate client and third-party system 130 data are communicated along with the request. The certificate authority system 140 receives the request and verifies any suitable information or data. Because the service provider system 120 has pre-built the connection, appropriate data is typically provided on the first attempt. The service provider system 120 has built into the code of the certificate signing request all of the data required by the certificate authority system 140 to issue the certificate.

The digital certificate may be used to assure the service provider system 120 that the device requesting a communication is actually the device that is authorized. For example, if a system, such as the service provider system 120 wants to communicate with a requester, such as the client or the third-party system 130 securely, the requester acquires a digital certificate from a certificate authority system 140. In order to receive a certificate, the requester follows a process as follows. The certificate authority system 140 creates the digital certificate using a public key for the requestor and other identity information. In many example Internet protocols, the standard used to create this certificate is x.509. The public/private key pair can be created either by the certificate authority system 140 or by the requester. When the certificate authority system 140 creates the public key on behalf of the user, the certificate authority system 140 sends the private key securely to the requester. If the requester creates public and private key pair, then the requester needs to send the public key securely to the certificate authority system 140 in order to create the digital certificate. In the example, the private key is created by the service provider system 120 and is communicated to the client computing system 110.

The certificate authority system 140 signs the certificate with its own private key to ensure the authenticity, integrity, and non-repudiation of the digital certificate. Finally, the certificate authority system 140 sends back the certificate to the requester, which can be used to establish secure communication.

The certificate authority system 140 creates the certificate based on the request and the provided data. Identifying information embedded in the certificate may include the client name and e-mail address, the name of the certificate authority system 140, a serial number, and any activation or expiration data for the certificate. The certificate authority system 140 communicates the certificate to the service provider system 120. When the service provider system 120 receives the certificate, the service provider system 120 notifies the client computing device 110 that the certificate is ready for use. The details of block 270 are illustrated in greater detail in FIG. 6.

Figure 6:
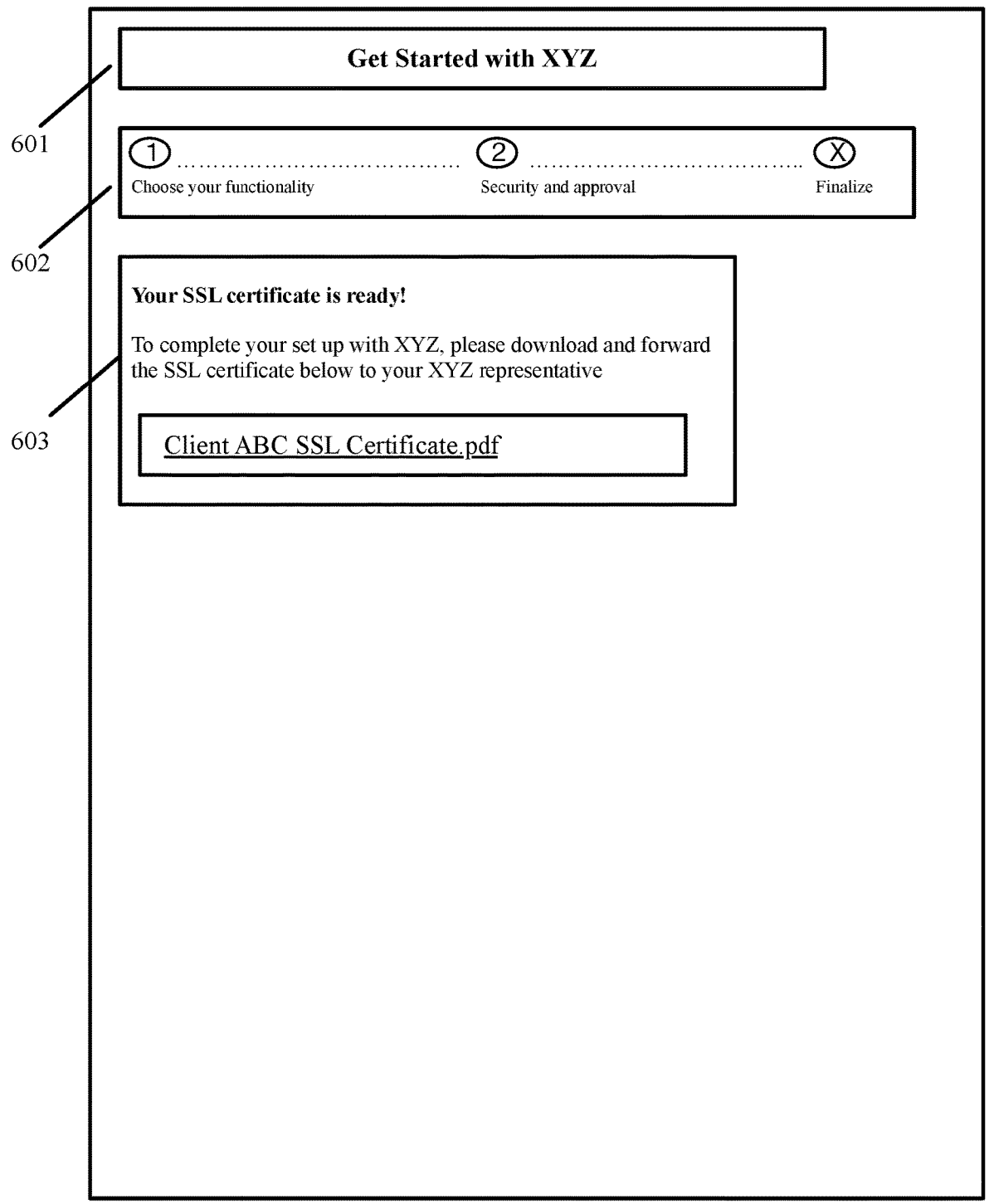
FIG. 6 is an illustration of an example graphical user interface to finalize a connection of a selected third-party system.

FIG. 6 is an illustration of an example screen 600 on a graphical user interface 122 to finalize a connection of a selected third-party system 130. When the service provider system 120 receives the certificate, the service provider system 120 notifies the client computing device 110 to log into the connection portal 121. The connection portal 121 displays on the graphical user interface 122 a screen 600 to download the certificate.

The screen 600 is illustrated with a title block 601 that indicates the type of screen 500 being presented. Status block 602 illustrates the stage of the connection journey being presented. In the example, the client is at the Finalize stage. The screen 600 is illustrated with a certificate block 603. The block 603 has a link or other interface object to allow a client to download the certificate. In the example, the certificate is an SSL certificate. The client may click the link and download the certificate to the client computing device 110.

Returning to FIG. 2, in block 280, the service provider system 120 provides access to data and services associated with the client to the third-party system 130 upon request based on the certificate authority certificate. For example, with the certificate, the client computing device 110 may authorize the service provider system 120 to provide data via an API 126 to the third-party device 131. Because the connection was pre-configured, the third-party device 131 may connect directly to the API 126 to allow the data to be shared. The third-party device 131 uses the appropriate formatting and protocols of the API 126 to make the API call based on the configured connection. When the third-party device 131 places an API call to the service provider system 120, the certificate may be provided with the call to verify the third-party device 131. Testing of the connection is minimal or non-existent because the connection was previously simulated and tested.

The service provider system 120 uses the certificate to verify the identity of the client computing device 110 and that data may be shared with the third-party system 130. When the third-party device 130 uses the appropriate API 126 to access data in the user account of the client, data may be shared or downloaded. In the example, the third-party system 130, XYZ Data Management, may use the data from the user account to perform data management services for the client.

Example Systems

FIG. 7 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A system to provide connections to third-party systems by using pre-built and pre-tested standardized connectors with built-in security processes, comprising:
   a processor of a service provider communicatively coupled to a storage device, wherein the processor executes application code instructions that are stored in the storage device to cause the system to:
preconfigure one or more third-party systems connections, the pre-configuration for each third-party system connection comprising software code to:
establish, before a received request of a third-party system to connect with the client system data, a type of certificate required from a certificate authority system,
establish, before the received request of a third-party system to connect with the client system data, a security level required for each third-party system connection,
configure, before the received request of a third-party system to connect with the client system data, instructions that, when provided to each of the third-party systems, allow a device of each of the third-party systems to communicate an API call to the processor with appropriate formatting and parameters; and
validate, before the received request of a third-party system to connect with the client system data, the pre-configuration for a plurality of different types of computing devices associated with the third-party system;
based on a received request of a third-party system to connect with the client system data, generate an API certificate signing request for the client system or a third-party system;
communicate a private key to the client system or to the third party system; and
communicate the client system data, third-party system data, and the certificate signing request to a certificate authority system.

2. The system of claim 1, further comprising application code instructions to cause the system to present a graphical user interface to a user of a client system with representations of each third-party system connection from which the request is received.

3. The system of claim 2, wherein the graphical user interface is presented to a user on a client computing device.

4. The system of claim 2, wherein the graphical user interface is accessed by a client computing device on a website or on an application of the service provider.

5. The system of claim 1, further comprising application code instructions to cause the system to identify certificate requirements for each of the one or more third-party connections.

6. The system of claim 1, further comprising application code instructions to cause the system to identify security levels requirements for each of the one or more third-party connections.

7. The system of claim 1, further comprising application code instructions to cause the system to receive the selection of the third-party system connection to connect with the client system data.

8. The system of claim 1, further comprising application code instructions to cause the system to validate the pre-configuration for each third-party system connection before presenting the graphical user interface to the user of the client system.

9. The system of claim 8, wherein pre-configuration for each third-party system connection is standardized to connect each third-party system connection with any requesting client system.

10. The system of claim 1, further comprising application code instructions to cause the system to provide, based on the establishing of the certificates, access to data via APIs to the third-party system.

11. A method to provide connections to third-party systems by using pre-built and pre-tested standardized connectors with built-in security processes, comprising:
preconfiguring, by one or more computing devices, one or more third-party systems connections, the pre-configuration for each third-party system connection comprising software code to:
establish, before a received request of a third-party system to connect with the client system data, a type of certificate required from a certificate authority system,
establish, before the received request of a third-party system to connect with the client system data, a security level required for each third-party system connection, and
configure, before the received request of a third-party system to connect with the client system data, instructions that, when provided to each of the third-party systems, allow a device of each of the third-party systems to communicate an API call to the processor with appropriate formatting and parameters;
based on a received selection of a first third-party system connection to connect with the client system data, generating, by the one or more computing devices, an API certificate signing request for the client system;
communicating, by the one or more computing devices, a private key to the client system; and
communicating, by the one or more computing devices, the client system data and the certificate signing request to a certificate authority system.

12. The method of claim 11, further comprising presenting, by the one or more computing devices, a graphical user interface to a user of a client system with representations of each third-party system connection.

13. The method of claim 11, further comprising identifying certificate requirements for each of the one or more third-party connections.

14. The method of claim 11, further comprising identifying security levels requirements for each of the one or more third-party connections.

15. The method of claim 11, further comprising receiving the request of the first third-party system connection to connect with the client system data.

16. The method of claim 11, further comprising validating the pre-configuration for each third-party system connection before presenting the graphical user interface to the user of the client system.

17. A computer program product, comprising:
a non-transitory computer-readable medium having computer-readable program instructions embodied thereon, the computer-readable program instructions comprising instructions to:
preconfigure one or more third-party systems connections, the pre-configuration for each third-party system connection comprising software code to:
establish, before a received request of a third-party system to connect with the client system data, a type of certificate required from a certificate authority system, establish, before the received request of a third-party system to connect with the client system data, a security level required for each third-party system connection, and configure, before the received request of a third-party system to connect with the client system data, instructions that, when provided to each of the third-party systems, allow a device of each of the third-party systems to communicate an API call to the processor with appropriate formatting and parameters;

generate an API certificate signing request for the client system for a selected third-party system;

communicate the client system data, third-party system data, and the certificate signing request to a certificate authority system; and based on the establishing of the certificates provide access to data via APIs to the first third-party system.

18. The computer programming product of claim 17, further comprising computer-readable program instructions to communicate a private key to the client system.

19. The computer programming product of claim 17, wherein the pre-configuration further comprises software code that establishes a type of certificate required from a certificate authority system and a security level required for each third-party system connection.

20. A system to provide connections to third-party systems by using pre-built and pre-tested standardized connectors with built-in security processes, comprising:

a processor of a service provider communicatively coupled to a storage device, wherein the processor executes application code instructions that are stored in the storage device to cause the system to:

preconfigure one or more third-party systems connections, the pre-configuration for each third-party system connection comprising:

establishing, before a received request of a third-party system to connect with the client system data, a type of certificate required from a certificate authority system, establishing, before the received request of a third-party system to connect with the client system data, a security level required for each third-party system connection, and configuring, before the received request of a third-party system to connect with the client system data, instructions that, when provided to each of the third-party systems, allow a device of each of the third-party systems to communicate an API call to the processor with appropriate formatting and parameters;

present a graphical user interface to a user of a client system with representations of each third-party system connection;

based on a received selection of a third-party system connection to connect with the client system data, generate an API certificate signing request for the client system or a third-party system associated with the third-party system connection;

communicate the client system data, third-party system data, and the certificate signing request to a certificate authority system; and based on the establishing of the certificates provide access to data via APIs to the third-party system.

* * * * *